United States Patent
Samori et al.

(10) Patent No.: US 10,569,291 B2
(45) Date of Patent: *Feb. 25, 2020

(54) FILM FORMATION METHOD AND FILM FORMATION APPARATUS FOR THIN FILM

(71) Applicant: SHINCRON CO., LTD., Kanagawa (JP)

(72) Inventors: Shingo Samori, Kanagawa (JP);
Shinichi Takase, Kanagawa (JP);
Satoshi Sugawara, Kanagawa (JP);
Ekishu Nagae, Kanagawa (JP);
Yousong Jiang, Kanagawa (JP)

(73) Assignee: SHINCRON CO., LTD., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/102,471

(22) PCT Filed: May 23, 2014

(86) PCT No.: PCT/JP2014/063655
§ 371 (c)(1),
(2) Date: Jun. 7, 2016

(87) PCT Pub. No.: WO2015/177916
PCT Pub. Date: Nov. 26, 2015

(65) Prior Publication Data
US 2017/0072418 A1    Mar. 16, 2017

(51) Int. Cl.
*B05B 17/04* (2006.01)
*B05B 16/60* (2018.01)
(Continued)

(52) U.S. Cl.
CPC ............... *B05B 17/04* (2013.01); *B05B 9/04* (2013.01); *B05B 13/0221* (2013.01);
(Continued)

(58) Field of Classification Search
CPC .... B05B 13/0221; B05B 9/04; B05B 15/1222
See application file for complete search history.

(56) References Cited

U.S. PATENT DOCUMENTS

2003/0235935 A1* 12/2003 Yamazaki ........... H01L 51/0005
438/89

FOREIGN PATENT DOCUMENTS

EP    0 581 216 A1    2/1994
JP    6-293519 A    10/1994
(Continued)

OTHER PUBLICATIONS

Oshima et al. Construction of New CVD Evaporation Supply by Flashing Spray With Two Component Solution, Iclass-2006, Aug. 27-Sep. 1, 2006, 6 pages (Year: 2006).*

(Continued)

*Primary Examiner* — Kelly M Gambetta
(74) *Attorney, Agent, or Firm* — Kenealy Vaidya LLP

(57) ABSTRACT

A method for forming a thin film having durability at a low cost is provided. A film formation apparatus 1 is used in the film formation method. The apparatus 1 comprises a vacuum container 11 in which a substrate 100 is placed at a lower part, a vacuum pump 15 for exhaust inside the container 11, a storage container 23 for storing a coating agent 21 provided outside the container 11, and a nozzle having an ejection part 19 capable of ejecting the coating agent 21 at its one end. A solution including two or more kinds of materials is used as the coating agent 21. The solution is ejected to the substrate in an atmosphere at a pressure set based on vapor pressures of respective materials composing the solution.

10 Claims, 1 Drawing Sheet

(51) Int. Cl.
*B05D 5/08* (2006.01)
*B05B 9/04* (2006.01)
*B05B 13/02* (2006.01)
*B05D 1/02* (2006.01)
*B05D 3/04* (2006.01)
*B05B 14/20* (2018.01)
*C03C 17/30* (2006.01)

(52) U.S. Cl.
CPC .............. *B05B 14/20* (2018.02); *B05B 16/60* (2018.02); *B05D 1/02* (2013.01); *B05D 3/0493* (2013.01); *B05D 5/083* (2013.01); *C03C 17/30* (2013.01); *B05D 2203/35* (2013.01); *C03C 2217/76* (2013.01); *C03C 2218/15* (2013.01)

(56) References Cited

FOREIGN PATENT DOCUMENTS

| | | |
|---|---|---|
| JP | 9-309745 A | 12/1997 |
| JP | 2001-252600 A | 9/2001 |
| JP | 2003-257631 A | 9/2003 |
| JP | 2004-87465 A | 3/2004 |

OTHER PUBLICATIONS

International Search Report for PCT/JP2014/063655 dated Aug. 26, 2014.

\* cited by examiner

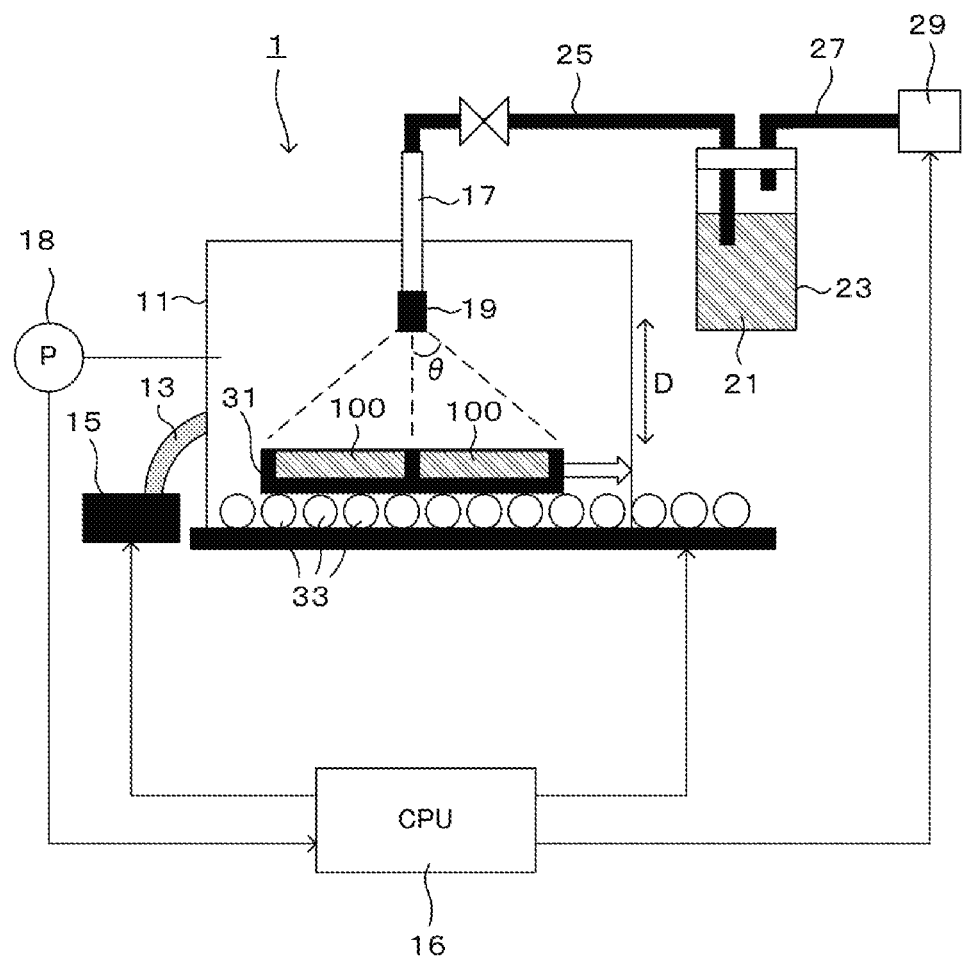

FILM FORMATION METHOD AND FILM FORMATION APPARATUS FOR THIN FILM

This application is a U.S. national phase filing under 35 U.S.C. § 371 of PCT Application. No. PCT/JP2014/063655, filed on May 23, 2014, which is hereby incorporated by reference in its entirety.

TECHNICAL FIELD

The present invention relates to a film formation method and apparatus for forming a thin film in a vacuum. The thin film includes, for example, an organic film and inorganic film, etc.

BACKGROUND ART

Use of a wet coating method, such as a paint-on method and dipping method, has been known as a film formation method for forming an organic or inorganic film as an example of a thin film on a surface of a substrate. For example, the patent document 1 proposes a film formation method for forming 10 to 400 nm-depth scratches to give a strip-shaped fine pattern in a predetermined direction on a surface of a glass or plastic substrate in the air, then, applying a coating liquid (dilute solution) prepared to have a predetermined composition and drying so as to form an antifouling film (organic film) having a predetermined composition on the finely patterned surface. Also, the patent document 2 proposes a film formation method for forming an inorganic titanium oxide film (inorganic film) by mixing titanium oxide particles in water to obtain a suspension, adjusting it to have a specific pH, then, applying the suspension to a support body and drying.

RELATED ART DOCUMENTS

Patent Document

Patent Document 1: Japanese Unexamined Patent Publication (Kokai) No. H09-309745
Patent Document 2: Japanese Unexamined Patent Publication (Kokai) No. H06-293519

SUMMARY OF THE DISCLOSED SUBJECT MATTER

A dilute liquid having a low solute concentration is used as a coating liquid or suspension in the wet coating method. Therefore, a density of the film to be obtained after drying by heat becomes low and, along therewith, a function of the film to be formed is liable to be lost, which is a problem. For example, in an antifouling film coated by the wet coating method, a film formed on the outermost surface comes off easily by wiping and the oil repellency is lost in some cases.

On the other hand, a film formation method for forming a thin film on a substrate by using a vacuum vapor deposition method (dry coating method) may be also considered. When using this method, however, a highly vacuum condition has to be created when forming a film and an expensive evacuation system is required. As a result, film formation at a low cost is hard to be realized.

According to an aspect of the present invention, a film formation method and apparatus capable of forming a thin film having durability at a low cost are provided.

In the present invention, "ejection" means blowing out a liquid in a liquid state. "Ejection" also includes "spraying", which is blowing out by spraying a liquid. In this "ejection", a physical state and chemical state of a material in the liquid do not change before and after the ejection. Therefore, "ejection" has a different principle from that in vapor deposition, wherein a physical state of a material changes from liquid or solid to a gas, or from that in CVD, wherein a chemical state of a material changes.

The present inventors found that, when ejecting a solution in an atmosphere with a specific pressure (Pc) set based on vapor pressures (P1, P2, P3, . . . ) of two or more kinds of materials composing the solution, a durable thin film was able to be formed even if a solute concentration of the solution is low (in other words, even if the solution to be ejected is a dilute solution). Also, they found that the specific pressure Pc mentioned above for ejecting the solution often belongs to a medium or low vacuum range, therefore, a durable thin film can be formed at a low cost comparing with the vapor deposition method, which requires to create a high vacuum condition when forming a film, and accomplished the present invention.

According to the first aspect of the present invention (the first invention), a film formation method of a thin film having the configuration below is provided. In this film formation method, it is on the premise that a thin film is formed on a substrate in a vacuum. Also, it has a feature that a solution including two or more kinds of materials (for example, a first material (S1), a second material (S2) and a third material (S3), . . . , etc. It will be the same hereinafter.) is ejected to a substrate in an atmosphere with a pressure (Pc) set based on vapor pressures (for example, P1, P2, P3, . . . , etc. It will be the same hereinafter.) of the respective materials (for example, S1, S2, S3, . . . , etc. It will be the same hereinafter.) composing the solution.

According to the second aspect of the present invention (second invention), a film formation apparatus having the configuration below is provided. It is on the premise that the film formation apparatus is used for forming a thin film on a substrate in a vacuum. The apparatus comprises a vacuum container, in which a substrate as a film formation subject is placed, an exhaust means for exhausting inside the vacuum container, a storage container for storing a solution including two or more kinds of materials, and a nozzle for ejecting the solution to a substrate placed inside the vacuum container. It is configured that, when a pressure inside the vacuum container becomes a pressure (Pc) set based on vapor pressures of respective materials composing the solution, the solution is ejected to the substrate from the nozzle.

In the present invention (the first invention and second invention), when respective materials composing the solution to be ejected to a substrate include a first material (S1) and a second material (S2) having a vapor pressure (P2) higher than a vapor pressure (P1) of the S1, a pressure (Pc) in an atmosphere at ejecting the solution is preferably higher than P1 and lower than P2. Note that, in the present invention, even if the pressure (Pc) in an atmosphere when ejecting the solution is set to be P1 or lower and P2 or higher, it is possible to form a thin film recognized as being durable in practical use.

In the second invention, a substrate as a film formation subject may be placed at a lower part inside the vacuum container (that is, a lower part in the longitudinal direction) or on the side part inside the vacuum container (that is, a side part in the horizontal direction). An end (ejection part) of the nozzle may be arranged so as to be able to eject the solution downward (either vertically or obliquely) (hereinafter, also simply referred to as "ejection direction of the solution is downward") when a substrate is placed at a lower part inside the vacuum container, or may be arranged so as to be able to eject the solution crosswise (either horizontal or diagonal) (hereinafter, also simply referred to as "the ejection direction of the solution is crosswise") when the substrate is placed at a side part inside the vacuum container. Namely, in the second invention, a position of providing the ejection part is not limited.

It is the same also in the first invention, and the ejection direction of the solution may be either downward or crosswise.

In the second invention, an inline type having a conveying mechanism for conveying a substrate is also applicable. In the first invention, when performing film formation by the inline type having a conveying mechanism, productivity improves, which is advantageous.

According to the first invention, a solution composed of two or more kinds of materials including S1 and S2 is ejected to a film formation subject (substrate) in an atmosphere with a pressure Pc (as an example, a pressure higher than P1 (P1<Pc) and lower than P2 (Pc<P2)) which is set based on vapor pressures (for example, P1 of S1 and P2 of S2, etc. P1<P2) of the respective materials (for example, S1 and S2, etc.) as constituent materials of the solution to be ejected to the substrate. When ejecting the solution under the pressure Pc, volatilization of S2 is caused on the substrate but that of S1 is not caused. Therefore, a thin film to be formed on the substrate becomes high in density. Namely, according to the first invention, a durable thin film can be formed at a low cost.

According to the second invention, it is configured that when a pressure inside a vacuum container becomes the pressure Pc set based on the vapor pressures of the respective materials composing the solution to be ejected to the substrate, the solution composed of two or more kinds of materials is ejected from the nozzle to the film formation subject (substrate). When ejecting the solution with the pressure Pc in the vacuum container, volatilization of S2 is caused while that does not happen to S1. Therefore, a thin film to be formed on the substrate becomes high in density. Namely, according to the second invention, a durable thin film can be formed at a low cost.

In addition to that, according to the present invention, by properly adjusting a solute concentration of the solution to be ejected (for example, 0.01 wt % or more), durability of a thin film to be obtained can be improved furthermore and it is also possible to attain a furthermore low cost in forming thin films.

BRIEF DESCRIPTION OF DRAWINGS

FIG. 1 is a schematic sectional view showing an example of a film formation apparatus capable of implementing the method of the present invention.

DESCRIPTION OF NUMERICAL NOTATIONS

1 . . . film formation apparatus, 11 . . . vacuum container, 13 . . . pipe, 15 . . . vacuum pump (exhaust means), 16 . . . controller, 17 . . . nozzle, 18 . . . pressure detection means, 19 . . . ejection part, 21 . . . coating agent, 23 . . . storage container, 25 . . . liquid feed tube, 26 . . . valve, 27 . . . pipe, 29 . . . gas supply source, 31 . . . substrate holder, 33 . . . roller (conveying mechanism), 100 . . . substrate

EXEMPLARY MODE FOR CARRYING OUT THE DISCLOSED SUBJECT MATTER

Below, an embodiment of the invention above will be explained based on the drawing.

<Configuration Examples of Film Formation Apparatus>

First, an example (the case wherein an ejection direction of a solution is downward) of the film formation apparatus of the present invention (the apparatus of the present invention) will be explained.

As shown in FIG. 1, a film formation apparatus 1 as an example of the apparatus of the present invention comprises a vacuum container 11, in which a substrate 100 as a film formation subject is placed. The vacuum container 11 is configured as a cavity body having an approximate parallelepiped shape in this example, however, the shape is not limited to that in the present invention.

An exhaust port for exhaustion (illustration is omitted) is provided near a lower end on a sidewall of a vacuum container 11. The exhaust port is connected to an end of a pipe 13, and the other end of the pipe 13 is connected to a vacuum pump 15 (exhaust means). The vacuum pump 15 may be any as long as being able to create a vacuum state from an air pressure to a medium vacuum (0.1 Pa to 100 Pa) or so, such as a rotary pump (oil rotary vacuum pump). It is not necessary to use pumps requiring a high cost for introduction, such as a turbo molecular pump (TMP) and an oil diffusion pump, which can produce a high vacuum state (lower than 0.1 Pa). Therefore, an apparatus cost can be reduced in this example.

The vacuum pump 15 operates by an instruction from a controller 16 (control means) and a vacuum degree (pressure) inside the container 11 is heightened by depressurizing through a pipe 13. In the vacuum container 11, a pressure detection means 18 (a pressure gauge, etc.) is provided for detecting a pressure inside the container 11. Information on the pressure inside the container 11 detected by the pressure detection means 18 is output to the controller 16 sequentially. When the controller 16 determines that the pressure inside the container 11 reached a predetermined value, it sends an operation instruction to a gas supply source 29 (explained later).

The pressure inside the container 11 may be also controlled, for example, by introducing an argon or other gas to the container 11 via a flow rate regulator (illustration is omitted), such as a mass flow controller (MFC), under monitoring by the pressure control unit (illustration omitted), such as an auto pressure controller (APC). Also, it may be configured to provide a valve (illustration omitted) in the middle of the pipe 13 connecting the exhaust port of the container 11 to the pump 15 so as to control the pressure in the container 11 by adjusting an opening degree of the valve in a state that the pump 15 is in operation.

In this example, it may be also configured that an opening/closing door (illustration omitted) is provided as a separation means capable of opening and closing at the lower part on the sidewall of the vacuum container 11 so as to be connected to a load lock chamber (illustration omitted) through the opening/closing door.

In this example, at an upper part inside the vacuum container 11, one end of a nozzle 17 is inserted downwardly and the other end of the nozzle 17 is exposed to outside the container 11. The one end of the nozzle 17 inside the container 11 is connected to an ejection part 19. Note that the number of nozzles 17 to be inserted to the container 11 is not limited. A plurality of nozzles 17 may be used for one container 11 depending on a size of the container 11 in some cases. In this example, when assuming that the extending direction of the nozzle 17 is a center axis, the ejection part 19 is preferably configured to be able to spray a coating agent 21 in a full conical shape or a fan shape at an angle θ, for example, 30 degrees or more and 80 degrees or less with respect to the center axis. Solution-state particles having a size of, for example, several hundreds μm are ejected from the ejection part 19.

At the other end of the nozzle 17 exposed to outside the container 11 is connected to an end of a liquid feed tube 25 whose other end is inserted to a storage container 23 for storing the coating agent 21 in a closed way. Thereby, it is configured that, when the valve 26 is open, the coating agent 21 fed through the liquid feed tube 25 from the storage container 23 is ejected to the lower part inside the container 11 from the ejection part 19 connected to one end of the nozzle 17.

In this example, the storage container 23 is connected to an end of a pipe 27 for gas supply in order to pressurize a liquid surface inside the container 23, and the other end is connected to a gas supply source 29.

The gas supply source 29 operates in response to an instruction from the controller 16 and supplies a gas to the pipe 27, so that the liquid surface in the storage container 23 is pressurized. Thereby, the liquid surface in the storage container 23 is pressurized and the coating agent 21 is fed to the liquid feed tube 25 due to the pressure in this example. Note that the mode is not limited to feeding the coating agent 21 by pressurizing like this in the present invention.

A substrate holder 31 for holding the substrate 100 as a film formation subject is arranged at a lower part in the vacuum container 11. The substrate holder 31 is supported by a conveying mechanism composed of a plurality of rollers 33, 33, . . . , etc. in this example, and the substrate holder 31 is movable inside the container 11 by operating the conveying mechanism. Note that moving here includes rotating in addition to straight-line move (as in this example). In the case of rotating, the substrate holder 31 may be configured, for example, to be a turntable style. The substrate holder 31 has a concave-shaped substrate holding surface on its inner surface, where a back surface of a substrate 100 (either one or more) as a film formation subject contacts, so that the substrate 100 is held.

In the present invention, distance D between the ejection part 19 and the substrate 100 is not particularly limited as long as it is a distance that the coating agent 21 to be ejected in a liquid state from the ejection part 19 can reach as a liquid to the substrate 100. It is because the distance from the ejection part 19 that the coating agent 21 can reach the substrate 100 changes due to various elements, such as a direction of the ejection part 19, initial speed of the coating agent 21 when ejected from the ejection part 19 and a vapor pressure (P2) of a second material (S2, explained later) at a normal temperature included in the coating agent 21.

In this example, wherein the ejection direction of the coating agent 21 is downward, an arrangement of the ejection part 19 and the substrate holder 31 are adjusted so that the distance D becomes about 300 mm or less, consequently, sufficient strength can be given easily to a thin film to be obtained and the level of durability is improved easily.

In this example, wherein the ejection direction of the coating agent 21 is downward, by arranging the ejection part 19 so that the distance D to the substrate 100 becomes 150 mm or more, an effective ejection range for the coating agent 21 is secured sufficiently, which contributes to suppress a useless consumption of the coating agent 21, and that consequently may contribute to a furthermore reduction of a film formation cost.

Note that in this example, wherein the ejection direction of the coating agent 21 is downward, when the distance D is too far, volatilization of a dilute agent (solvent) in the coating agent 21 arises in the middle of ejection and leveling after reaching to the substrate hardly occurs, consequently, a film distribution becomes uneven and film performance declines in some cases. When the distance D is too short, the effective ejection range becomes small in accordance therewith, so that a useless consumption of the coating agent 21 increases and film unevenness may be caused.

The controller 16 has a function of controlling a pressure inside the container for adjusting a vacuum degree (that is, a pressure at starting film formation) inside the container 11 by operating the vacuum pump 15 and the pressure detection means 18. Together therewith, the controller 16 also has a function of controlling a pressure for pressurizing a liquid surface for adjusting a pressure imposed to the liquid surface inside the storage container 23 by a gas to be supplied from the gas supply source 29. Note that the controller 16 also has a control function of operating and stopping the conveying mechanism composed of a plurality of rollers 33, etc.

<Film Formation Example>

Next, an example of the film formation method of the present invention (the method of the present invention) using the film formation apparatus 1 will be explained.

(1) First, a coating agent 21 is prepared. In this example, an example, wherein the coating agent 21 is composed of a solution including two kinds of materials, a first material (S1) and a second material (S2), will be explained, wherein S1 is a solute (a component to be dissolved in a solvent) and S2 is a solvent (a component for a solute to be dissolved: liquid).

Note that a liquid is also included in the solute in addition to powder or other solid. When the coating agent 21 is composed of a mixture of a liquid and a liquid, a component accounting a larger amount of presence or rate in the coating agent 21 is a solvent, which is S2 in this example.

An organic film and inorganic film are examples of a thin film. An organic-inorganic hybrid film, etc. formed by a material having both an organic component and inorganic component are also included. As those thin films, an antifouling film, water repellent film, moistureproof film, organic EL film and titanium oxide film, etc. may be mentioned and, as respective constituent materials (corresponding to S1 in this example), for example, hydrophobic reactive organic compounds (organic compounds having at least one hydrophobic group and at least one reactive group capable of bonding with a hydroxyl group in one molecular), water repellent materials, moistureproof materials, organic EL materials and titanium oxides, etc. may be mentioned.

For example, as a hydrophobic reactive organic compound as a solute S1 capable of forming an antifouling film, which is an example of an organic-inorganic hybrid film, an organic silicon compound, etc. including a polyfluoroether group or a polyfluoroalkyl group may be mentioned. To raise product examples, OF-SR (oil repellent agent) and OF-110 (water repellent agent), etc. of Canon Optron Inc. may be mentioned.

Among the hydrophobic reactive organic compounds mentioned above, it is particularly preferable to select a substance (being liquid at a normal temperature) having a low vapor pressure (P1) at a normal temperature, such as $10^{-4}$ Pa or so or lower (preferably $0.8 \times 10^{-5}$ Pa to $3 \times 10^{-4}$ Pa or so and more preferably $10^{-4}$ Pa or lower).

A solvent S2 to be used is not particularly limited as long as a solute S1 can be dissolved therein. When using a hydrophobic reactive organic compound including fluorine as a solute S1, it is preferable to use a solvent, which also includes fluorine (a fluorine-type solvent), because the affinity becomes high.

As a fluorine-type solvent, for example, fluorine-modified aliphatic hydrocarbon-type solvent (perfluoroheptane, perfluorooctane, etc.), fluorine-modified aromatic group hydrocarbon-type solvent (m-xylenehexafluoride, benzotrifluoride, etc.), fluorine-modified ether-type solvent (methylperfluorobutylether, perfluoro(2-butyltetrahydroflane), etc.), fluorine-modified alkylamine-type solvent (perfluorotributylamine, perfluorotripencylamine, etc.), etc. may be mentioned.

Among the fluorine-type solvents mentioned above, it is particularly preferable to select a substance having a very high vapor pressure (P2) at a normal temperature, for example, $10^3$ Pa or so or higher (preferably $0.8 \times 10^3$ Pa or higher and an atmosphere pressure of lower than $1.01325 \times 10^5$ Pa or so, more preferably $6.0 \times 10^3$ Pa to $1.6 \times 10^4$ Pa or so) and excellent volatility at a normal temperature.

Fluorine-type solvent may be used alone or in combination of two or more kinds. When mixing two or more kinds to use, it is preferable that they are selected so that the mixture as a whole has a vapor pressure in the range explained above.

A coating agent 21 to be used has a S1 concentration (solute concentration) of 0.01 wt % or more, preferably 0.03 wt % or more and more preferably 0.05 wt % or more. When using a coating agent 21 having a solute concentration of 0.01 wt % or more, a durability level of a thin film to be obtained can be improved easily. When the solute concentration is too low, even if a film formation start pressure (explained later) and a liquid ejection pressure are adjusted properly, the coating agent 21 drops undesirably from the ejection part 19 before starting film formation and film formation cannot be performed properly in some cases.

The upper limit of the solute concentration may be determined to be in a range of not causing so-called liquid clogging by sticking inside the liquid feed tube 25 or ejection part 19 in consideration of kinds of solute S1 and solvent S2 to be used, an inner diameter and length of the liquid feed tube 25 and the configuration of the ejection part 19, etc. When using a hydrophobic reactive organic compound as the solute S1 and a fluorine-type solvent as the solvent S2, a solute concentration in the coating agent 21 may be, for example, 2 wt % or less, preferably 1 wt % or less and more preferably 0.1 wt % or less. When the solute concentration is 2 wt % or less, film unevenness is hardly caused on the film formation surface (adherence of excessive material, which does not form a film) of the film formation subject (a plurality of substrates 100), consequently, a useless consumption of the coating agent 21 can be suppressed and a cost of forming a thin film can be reduced furthermore easily. Note that when the solute concentration is too high, even if the film formation start pressure and liquid ejection pressure are adjusted properly, a solute component sticks inside the liquid feed tube 25 and ejection part 19 to cause so-called liquid clogging in some cases.

Viscosity of the coating agent 21 to be used is not particularly limited and may be adjusted properly in consideration of the inner diameter and length of the liquid feed tube 25 and the configuration of the ejection part 19, etc., so that the coating agent 21 flows smoothly in the liquid feed tube 25 and is ejected properly from the ejection part 19, therefore, the coating agent 21 does not stick inside the liquid feed tube 25 or ejection part 19 and so-called liquid clogging is not caused.

(2) Next, the prepared coating agent 21 is placed in the storage container 23. Also, a plurality of substrates 100 are held on the concave portion of the substrate holder 31 outside the container 11 in this example.

As the substrates 100, which can be held and fixed on the substrate holder 31, a glass substrate, metal substrate and plastic substrate, etc. may be mentioned. A non-heating type film formation (the method of not heating inside the container 11 at film formation) may be selected depending on a kind of the substrates 100. When selecting a non-heating type film formation, plastic substrates are also applicable in addition to glass substrates and metal substrates. As the substrates 100, those processed to have, for example, a plate shape or lens shape, etc. may be used. On the substrates 100, wet cleaning may be performed before fixing them to the substrate holder 31 or after fixing but before starting film formation.

(3) Next, the substrate holder 31 holding the plurality of substrates 100 is set inside the container 11 (in the case of batch processing). During this, by opening the opening/closing door (explained above) provided at a lower part on the sidewall of the container 11 and operating the conveying mechanism (roller 33), the substrate holder 31 holding the substrates 100 may be transferred from a load lock chamber and set in the container 11. After that, the pump 15 is operated by an instruction from the controller 16 to start exhausting inside the vacuum container 11.

Note that the substrate holder 31 does not necessarily stay still in the container 11 but moves at a predetermined conveying speed inside the container 11 even during film formation (inline type) in the case of continuous processing. The faster the conveying speed is, the more advantageous in terms of productivity. However, it is preferable to be, for example, 50 to 90 mm/second or so in terms of an effective use of the coating agent (film formation material of a thin film corresponding to S1 in this example) and film performance, etc.

The controller 16 detects a pressure (Pc) inside the container 11 sequentially by an output from the pressure detection means 18. In this example, when it is determined that the pressure Pc in the container 11 is in a specific range, that is, the most effective predetermined pressure for improving durability of a thin film to be formed, which is higher than a vapor pressure (P1) of S1 included in the coating agent 21 (P1<Pc) and lower than a vapor pressure (P2) of S2 included in the coating agent 21 (Pc<P2), it is preferable to maintain this state by control by the function of controlling a pressure inside the container and the operation start instruction is sent to the gas supply source 29. The gas supply source 29, which received the operation instruction, supplies a gas into the pipe 27 and the gas pressurizes a liquid surface inside the storage container 23. As a result, the coating agent 21 is fed through the liquid feed tube 25 by the pressure, introduced to the nozzle 17, then ejected from the ejection part 19 to inside the container 11.

It is not necessary to impose any pressure (ejection pressure) to the coating agent 21 when ejecting from the ejection part 19. It is because as long as the pressure Pc inside the container 11 is maintained to be in the range above (explained above, P1< and <P2), ejection can be made with a liquid ejection form being most effectively spread (shower-like shape), a useless consumption of the liquid is reduced, thin film formation at a low cost can be realized, and the productivity is improved easily without imposing any ejection pressure to the coating agent 21. However, it is preferable to use a spray nozzle and furthermore to eject the coating agent 21 with an ejection pressure (gauge pressure) of 0.05 to 0.3 MPa in terms of stabilizing a shape of the ejection. By ejecting with a specific ejection pressure, the ejection shape is furthermore stabilized, a useless consumption of the liquid is furthermore reduced, thin film formation at a furthermore lower cost can be realized and the production efficiency is improved furthermore easily. To eject the coating agent 21 with the specific ejection pressure, a gas is fed to the pipe 27 so that the pressurization on the liquid surface in the storage container 23 becomes 0.05 to 0.3 MPa.

Ejection duration of the coating agent 21 from the ejection part 19 is not limited as it changes depending on a size and the number of the substrates 100. A thickness of a thin film to be formed on the substrates 100 is not limited, either. It is because it changes depending on a kind of materials to be included in the coating agent 21 and the ejection duration of the coating agent 21, etc.

In this example, when ejecting the coating agent 21 to the substrates 100 from the ejection part 19 positioned away from the substrates 100 by distance D, the reason why the pressure Pc inside the container 11 is controlled preferably to be in a predetermined range (P1< and <P2) at starting ejection (that is, film formation) is because a solute component sticks inside the liquid feed tube 25 or ejection part 19 to cause so-called liquid clogging if the pressure Pc in the container 11 is not higher than vapor pressure P1 at normal temperature when starting ejection even if the solute concentration in the coating agent 21 to be used is adjusted properly. On the other hand, when the pressure Pc in the container 11 at starting ejection is vapor pressure P2 of S2 or higher at a normal temperature, solvent S2 does not volatile and remains after reaching to the substrates 100 due to the high atmosphere pressure even if the solute concentration in the coating agent 21 to be used is adjusted properly, which may result in a low film density.

Note that if only an ejection amount and ejection pressure of the coating agent 21 are adjusted properly even in the case where Pc is P1 or lower (≤P1), the possibility of preventing liquid clogging explained above becomes high and preferable film formation can be performed (namely, formation of a thin film recognized to have durability in practical use. It will be the same hereinafter.). Even in the case where Pc is P2 or higher (P2≤), if only a concentration and ejection pressure, etc. of the coating agent 21 are adjusted properly, it is possible to prevent a decline of a film density of a thin film to be formed on the substrates 100 and preferable film formation can be performed.

Accordingly, in the present invention, a timing that the controller 16 sends an instruction of start operation to the gas supply source 29 is not limited to when the pressure Pc in the container 11 becomes to be in the range explained above (P1<Pc<P2). What is meant thereby is that a predetermined pressure, which is most effective for improving durability of a thin film to be formed, is the range explained above (P1<Pc<P2).

Note that, when performing film formation under a too low pressure (for example, a pressure lower than P1 by more than one digit) comparing with a vapor pressure P1 of solute S1 at a normal temperature, a solute component supposed to be deposited to compose a thin film on the substrates 100 evaporates, as a result, the solute component does not adhere finely and uniformly on the substrates 100. If there is a part, on which a thin film does not exist, film peeling arises from this point during friction and improvement of film durability cannot be expected.

In the case of performing film formation under a too high pressure (for example, a pressure higher than P2 by one digit or more) comparing with vapor pressure P2 of solvent S2 at a normal temperature, a solvent remained during film formation is removed by a drying step, etc. after film formation, however, a film is not formed on that part (a solute component does not adhere uniformly, which results in a film defect). When the solute component does not adhere uniformly on the substrates 100, a part with no thin film formed thereon exists on the substrates 100, film peeling arises from this point with no film exists during friction, and improvement of film durability cannot be expected.

As a thin film to be formed in this example, as explained above, an antifouling film, water repellent film, moisture-proof film, organic EL film and titanium oxide film, etc. may be mentioned as examples. The present invention is a film formation method able to be applied to all compounds including organic materials, inorganic materials, organic-inorganic hybrid materials, etc. Below, the case where a thin film to be formed in this example is an antifouling film (an example of an organic-inorganic hybrid film) will be explained.

An antifouling film is a film provided with water repellency and oil repellency and has a function of preventing adhesion of oil stain. Here, "preventing adhesion of oil stain" means not only that oil stain does not adhere but it can be wiped off easily when stain adheres. Namely, an antifouling film keeps oil repellency. Specifically explaining, a durability level of an antifouling film has been improved most, such that even after reciprocating steel wool #0000 for more than 2000 times (preferably 4000 times and more preferably 6000 times) with a load of 1 $kg/cm^2$ on an antifouling film, an ink by an oily-ink pen can be wiped off.

The reason why durability is improved most as explained above is that, when ejecting the coating agent 21 to the substrates 100 from the ejection part 19 at a position away by distance D, pressure Pc in the container 11 at starting ejection is adjusted to a predetermined pressure (P1<Pc<P2), which is most effective for improving durability of a thin film to be formed, so that surfaces of the substrates 100 are covered with constituent molecules (thin film molecules) of a solute component to eliminate a part with no thin film existing thereon.

As already explained above, even if the pressure Pc in the container 11 when ejecting the coating agent 21 does not satisfy P1<Pc<P2 and is P1 or lower (≤P1) or P2 or higher (P2≤), preferable film formation can be performed, and a thin film to be obtained may attain a level recognized as being durable in practical use.

As explained above, according to the film formation method using the film formation apparatus 1 of the present example in the case where the ejection direction of the coating agent 21 is downward, a coating agent 21 obtained by mixing S1 and S2 and adjusting an S1/solute concentration therein as needed is used and ejected to the substrates 100 with specific pressure Pc, which is higher than vapor pressure P1 of S1 and lower than vapor pressure P2 of S2, and a thin film is formed. According to the film formation method in this example, the coating agent 21 ejected from the ejection part 19 reaches the substrates 100 while keeping the solution state and the pressure Pc in the container 11 is controlled properly, so that a solvent component evaporates after reaching the substrates 100 to form a film (thin film) and densified. As a result, it is possible to form a thin film having the most improved durability level on each substrate 100 at a low cost.

The reason why such an effect can be obtained is considered that, as explained above, by controlling the pressure Pc in the container 11 at starting ejection properly, evaporation of S1 is prevented and thin film molecules to compose a thin film can adhere finely and uniformly on the substrates 100, consequently, a part with no thin film formed is eliminated on the substrates 100.

In the case where a thin film to be formed by the method of this example is an antifouling film, according to the antifouling film, even if wiping off fingerprints and other oily component adhered on the surface with a heavy load (for example, 1 kg/cm$^2$ or so), a constituent of the antifouling film can remain effectively.

A thin film to be formed in the method of the present example is not limited to an antifouling film and there is an example of forming an inorganic film, as well. In the case of a suspension liquid of 4 g/litter prepared by mixing titanium oxide particles in water, when the pressure Pc in the container 11 is set to 1000 Pa to perform film formation, a titanium oxide film having preferable optical characteristic is formed, wherein a refractive index is 2.400 with a light having a wavelength of 550 nm. It is considered that, as a result of setting Pc to 1000 Pc, it becomes higher than a vapor pressure of titanium oxide at a normal temperature (there is no measurement data but calculated to be $10^{-10}$ Pa from an extrapolation value) and lower than a vapor pressure of water 3000 Pa or so at a normal temperature, consequently, fine inorganic titanium oxide film is formed and the preferable optical characteristic is obtained.

Other Embodiment

The film formation apparatus of the present invention is not limited to the mode of the film formation apparatus 1 explained above (the ejection direction of the coating agent 21 is downward) and the nozzle 17 may be arranged in the crosswise direction (the ejection direction of the coating agent 21 is crosswise). In the crosswise case, for example, one end of the nozzle 17 may be inserted in the horizontal direction from a side into the vacuum container 11 and the other end of the nozzle 17 may be exposed to the outside of the sidewall of the container 11. Alternatively, after attaching a rotatable member (illustration omitted) to around the middle of the nozzle 17 in the longitudinal direction so that a part below (including the ejection part 19) becomes rotatable, for example, by ±90 degrees or so, it may be arranged that one end (to which the ejection part 19 is connected) of the nozzle 17 is inserted downwardly from above into the vacuum container 11 and the other end of the nozzle 17 is exposed to the outside of the container 11. In either way, when the direction of installing the nozzle 17 is crosswise, the substrate holder 31 is arranged in the vacuum container 11 so that the surface of holding substrates 100 faces to the ejection part 19 connected to the end of the nozzle 17.

Alternatively, the substrate holder 31 may be configured to be movable and, separately from that, the nozzle 17 may be configured movable by a not shown conveying mechanism. In that case, this film formation means can be applied also to the mode wherein the nozzle 17 side moves.

EXAMPLES

Next, specific examples of the embodiments of the invention explained above will be given to explain the present invention in further detail.

Experimental Examples 1 to 6

1. Production of Antifouling Film Samples

The film formation apparatus shown in FIG. 1 was used and two substrates 100 (glass substrates having a size of 50 mm×100 mm) were set on the substrate holding surface of the substrate holder 31.

Coating agents 'a' to 'd' having compositions described in Table 1 were prepared.

TABLE 1

| Coating Agent | Solute S1 | | Solvent S2 | | Solution |
|---|---|---|---|---|---|
| | Kind | 25° C. Vapor Pressure P1 (Pa) | Kind | 25° C. Vapor Pressure P2 (Pa) | Concentration (wt %) |
| a | Oil Repellent Agent 1 | $10^{-5}$ | Solvent 1 | $1.6 \times 10^4$ | 0.05 |
| b | Oil Repellent Agent 2 | $10^{-5}$ | Solvent 2 | $6.0 \times 10^3$ | 0.05 |
| c | Oil Repellent Agent 1 | $10^{-5}$ | Solvent 2 | $6.0 \times 10^3$ | 0.05 |
| d | Oil Repellent Agent 2 | $10^{-5}$ | Solvent 1 | $1.6 \times 10^4$ | 0.05 |

Note that, in Table 1, "oil repellent agent 1" is a surface antifouling coating agent (manufactured by DAIKIN INDUSTRIES, ltd., Product Name: Optool DSX, component: fluorine-containing organosilicon compound), "oil repellent agent 2" is a fluorine-type antifouling coating agent (manufactured by Shin-Etsu Chemical Co., Ltd., Product Name: KY-178, component: fluorine-containing organosilicon compound), "Solvent 1" is a fluorine-type solvent (manufactured by Sumitomo 3M Limited, Product Name: Novec7200) and "Solvent 2" is a fluorine-type solvent (manufactured by Sumitomo 3M Limited, Product Name: Novec7300).

Pressure Pc in the container 11 at starting film formation, distance D and other film formation condition are shown in Table 2. As the ejection part of the nozzle, a spray nozzle capable of ejecting solution-state particles in a size of 140 to 260 μm was used, and ejection duration of a coating agent was all 30 seconds. Then, samples of respective experimental examples, which are antifouling films having a thickness of 10 to 15 nm formed on substrates 100, were obtained.

Note that, in the experimental examples 1 to 3, an antifouling film was formed in a state that the substrate holder 31 having substrates 100 set thereon was still in the vacuum container 11 (batch processing). In the experimental examples 4 to 6, the holder 31 having the substrates 100 set thereon was conveyed in the vacuum container 11 while performing film formation (continuous processing).

2. Evaluation 2-1. Durability of Antifouling Film

On a surface of an antifouling film of each of the obtained experimental example samples, 1 cm$^2$ of steel wool (SW) #0000 was placed and reciprocated (friction) with a load of 1 kg/cm$^2$ on a 50 mm straight line at a rate of reciprocating one time per one second. After repeating the reciprocating operation for 3500 times, a contact angle of pure water on the antifouling surface was measured. Also, a contact angle of pure water on the antifouling surface was measured immediately after film formation. The value of the contact angle was a contact angle after 1 minute from dropping of pure water and was an average value of measurement values obtained by repeating dropping and measuring for 5 times. The results are shown in Table 2.

2-2. Maximum Times of Frictional Reciprocating of Antifouling Film

On a surface of an antifouling film of each of the obtained experimental example samples, 1 cm² of steel wool (SW) #0000 was placed and reciprocated (friction) with a load of 1 kg/cm² on a 50 mm straight line at a rate of reciprocating one time per one second. Every 100 times of the reciprocating operation, a line was drawn with an oily-ink pen (organic solvent-type marker, Product Name: Mackee Ultrafine, manufactured by ZEBRA CO., LTD.) on the test surface (antifouling film surface) and whether or not the organic solvent-type ink of the oily-ink marker was able to be wiped off was evaluated. As the results, the maximum times of frictional reciprocating when the organic solvent-type ink was able to be wiped off are shown in Table 2.

pressure), a contact angle on the antifouling surface declined largely after SW friction from that immediately after film formation. Also, the maximum times of frictional reciprocating was extremely small and it was confirmed that durability was not given.

3-2. Continuous Processing Cases (Experimental Examples 4 to 6)

It was confirmed that, when conveying speed of the substrates becomes high, durability of the antifouling film declines and the maximum times of frictional reciprocating is liable to be less. The experimental example 5 exhibited good balance between a film performance and productivity.

TABLE 2

| | | Film Formation Condition | | | | Evaluation on Antifouling Film | | |
|---|---|---|---|---|---|---|---|---|
| | | | | Film Formation Start Pressure Pc (Pa) | Pressurization (Ejection Pressure) (MPa) | Contact Angle (degree) | | |
| Experimental Example | Coating Agent | Substrate Convey Rate (mm/s) | Distance D (mm) | | | Immediately After Film Formation | After SW Friction | Maximum Times of Frictional Reciprocating |
| 1 | a | 0 | 220 | 1000 | 0.1 | 112.5 | 106.3 | 3500 or more |
| 2 | b | 0 | 220 | 1000 | 0.1 | 113.7 | 105.7 | 3500 or more |
| 3 | b | 0 | 220 | 101325 (Atmospheric Pressure) | 0.1 | 111.3 | 40.6 | 500 |
| 4 | b | 40 | 300 | 4000 | 0.1 | 112.5 | 107.7 | 3500 or more |
| 5 | b | 80 | 300 | 4000 | 0.1 | 114.3 | 106.6 | 3500 or more |
| 6 | b | 100 | 300 | 4000 | 0.1 | 112.8 | 88.6 | 2000 |

3. Consideration

3-1. Batch Processing Cases (Experimental Examples 1 to 3)

As shown in Table 1 and Table 2, in the experimental examples 1 and 2 (ejection in a low vacuum), wherein the pressure Pc at ejecting the coating agent was higher than vapor pressure P1 of S1 and lower than vapor pressure P2 of S2, almost no decline was observed on the contact angle on the antifouling surface after the SW friction from that immediately after the film formation, and the durability was extremely excellent. Also, the maximum times of frictional reciprocating was sufficient as 3500 times or more, and it was confirmed that a wear resistant property sufficient for practical use was provided.

Although it is not shown in Table 2, in the case of ejecting at 10 Pa (a medium vacuum) under the same condition as in the experimental examples 1 and 2 (experimental examples 1a and 2a), almost equivalent results to that in the experimental examples 1 and 2 were obtained when a solution concentration was reduced to 0.01 wt % (experimental examples 1b and 2b) and when using solution 'c' or 'd' in Table 1 was used as the coating agent (experimental examples 1c and 2c). Also, under the same condition as in the experimental examples 1 and 2, when the solution concentration was reduced to 0.005 wt % (experimental examples 1d and 2d), durability of the antifouling films declines a little compared with that in the experimental examples 1 and 2, but it was also confirmed to be durable enough for practical use.

On the other hand, in the experimental example 3 wherein Pc was too higher than P2 (sprayed at an atmospheric

The invention claimed is:

1. A film formation method for forming a thin film on a substrate in a vacuum, comprising:
   providing a solution including two or more kinds of materials;
   ejecting the solution to a substrate in an atmosphere with a pressure set based on vapor pressures of respective materials composing the solution,
   wherein when materials composing the solution include a first material (S1) and a second material (S2) having a vapor pressure (P2) higher than a vapor pressure (P1) of the S1, ejecting the solution in an atmosphere with a pressure P1 or lower but not lower than one order of magnitude lower than P1, and
   ejecting includes ejecting the first material S1 in a vapor state and the second material S2 in a liquid state such that the second material S2 carries the first material S1 to the substrate, and causing the second material S2 to arrive at the substrate in the liquid state and evaporating the second material S2 after arrival at the substrate such that the first material S1 remains as a thin film, wherein
   the first material S1 is a fluorine containing solvent and the second material S2 is a material in which the fluorine containing solvent is dissolvable, and
   the first material S1 and the second material S2 are oil repellant agents.

2. The film formation method according to claim 1, wherein film formation is performed by an inline type having a conveying mechanism.

3. A film formation apparatus used for forming a thin film on a substrate in a vacuum, comprising
   a vacuum container wherein a substrate as a film formation subject is placed,
   a vacuum pump for exhausting inside the vacuum container, a storage container for storing a solution composed of two or more kinds of materials including a first material (S1) and a second material (S2) having a higher vapor pressure (P2) than a vapor pressure (P1) of the S1, a nozzle for ejecting the solution to the substrate, the nozzle having an ejection part configured to eject solution-state particles in a size of 140 µm to 260 µm, and a controller configured to cause the solution to be ejected when a pressure inside the vacuum container becomes a pressure P1 or lower but not lower than one order of magnitude lower than P1, the controller further configured to eject the first material S1 in a vapor state and the second material S2 in a liquid state such that the second material S2 carries the first material S1 to the substrate, and to cause the second material S2 to arrive at the substrate in the liquid state such that the second material S2 evaporates after arrival at the substrate and the first material S1 remains as a thin film, wherein the first material S1 is a fluorine containing solvent and the second material S2 is a material in which the fluorine containing solvent is dissolvable, and the first material S1 and the second material S2 are oil repellant agents.

4. The film formation apparatus according to claim 3, being an inline type provided with a conveying mechanism for conveying a substrate.

5. The film formation apparatus according to claim 3 further comprising a conveying mechanism configured to perform an inline type film formation.

6. The film formation apparatus according to claim 3, wherein the ejection part is configured to spray the solution in a full conical shape at an angle 30 degrees or more and 80 degrees or less with respect to a central axis of the nozzle.

7. A film formation apparatus used for forming a thin film on a substrate in a vacuum, comprising a vacuum container wherein a substrate as a film formation subject is placed, a vacuum pump for exhausting inside the vacuum container, a storage container for storing a solution composed of two or more kinds of materials including a first material (S1) and a second material (S2) having a higher vapor pressure (P2) than a vapor pressure (P1) of the S1, a nozzle for ejecting the solution to the substrate, the nozzle having an ejection part configured to spray the solution in a full conical shape at an angle 30 degrees or more and 80 degrees or less with respect to a central axis of the nozzle, and a controller configured to cause the solution to be ejected when a pressure inside the vacuum container becomes a pressure P1 or lower but not lower than one order of magnitude lower than P1, the controller further configured to eject the first material S1 in a vapor state and the second material S2 in a liquid state such that the second material S2 carries the first material S1 to the substrate, and to cause the second material S2 to arrive at the substrate in the liquid state such that the second material S2 evaporates after arrival at the substrate and the first material S1 remains as a thin film, wherein the first material S1 is a fluorine containing solvent and the second material S2 is a material in which the fluorine containing solvent is dissolvable, and the first material S1 and the second material S2 are oil repellant agents.

8. The film formation apparatus according to claim 7, being an inline type provided with a conveying mechanism for conveying a substrate.

9. The film formation apparatus according to claim 7 further comprising a conveying mechanism configured to perform an inline type film formation.

10. The film formation apparatus according to claim 7, wherein the ejection part is configured to eject solution-state particles in a size of 140 µm to 260 µm.

* * * * *